(12) United States Patent
Sivaramakrishnan et al.

(10) Patent No.: US 8,549,383 B2
(45) Date of Patent: Oct. 1, 2013

(54) CACHE TAG ARRAY WITH HARD ERROR PROOFING

(75) Inventors: Ramaswamy Sivaramakrishnan, San Jose, CA (US); Aaron S. Wynn, San Jose, CA (US); Connie Wai Mun Cheung, Sunnyvale, CA (US); Satarupa Bose, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 161 days.

(21) Appl. No.: 13/216,829

(22) Filed: Aug. 24, 2011

(65) Prior Publication Data

US 2013/0055011 A1    Feb. 28, 2013

(51) Int. Cl.
*G11C 29/00* (2006.01)
(52) U.S. Cl.
USPC .............................. 714/768; 714/718; 714/52
(58) Field of Classification Search
USPC .............. 714/768, 718, 52, 5, 6.24; 711/216
See application file for complete search history.

(56) References Cited

U.S. PATENT DOCUMENTS

| | | | |
|---|---|---|---|
| 5,500,950 A * | 3/1996 | Becker et al. | 711/118 |
| 5,533,189 A * | 7/1996 | Cheong et al. | 714/6.24 |
| 7,143,243 B2 | 11/2006 | Miller | |
| 7,219,349 B2 | 5/2007 | Merchant et al. | |
| 7,310,709 B1 | 12/2007 | Aingaran et al. | |
| 7,606,994 B1 | 10/2009 | Cypher | |
| 2010/0228912 A1 | 9/2010 | Huang et al. | |
| 2010/0275044 A1* | 10/2010 | Balakrishnan et al. | 713/320 |

* cited by examiner

*Primary Examiner* — Fritz Alphonse
(74) *Attorney, Agent, or Firm* — Miles & Stockbridge P.C.

(57) ABSTRACT

A cache memory system includes a cache controller and a cache tag array. The cache tag array includes one or more ways, one or more indices, and a cache tag entry for each way and index combination. Each cache tag entry includes an error correction portion and an address portion. In response to an address request for data that includes a first index and a first address, the cache controller compares the first address to the cache tag entries of the cache tag array that correspond to the first index. When the comparison results in a miss, the cache controller corrects cache tag entries with an error that correspond to the first index using the corresponding error correction portions, and stores at least one of the corrected cache tag entries in a storage that is external to the cache tag array. The cache controller, for each corrected cache tag entry, replays the comparison using the least one of the externally stored corrected cache tag entries.

20 Claims, 3 Drawing Sheets

CACHE TAG ARRAY WITH HARD ERROR PROOFING

FIELD

One embodiment is directed generally to a computer memory system, and in particular to a cache memory system.

BACKGROUND INFORMATION

A microprocessor can execute instructions at a very high rate, and it must be connected to a memory system in order to fetch the instructions. The typical memory system includes a large but relatively slow main system memory, and one or more cache memories.

A cache memory, or "cache", is a relatively small and fast storage system incorporated either inside or close to a processor or between a processor and the main system memory. A cache memory stores instructions or data, which can be quickly supplied to the processor. The effectiveness of the cache is largely determined by the spatial locality and temporal locality properties of a program involved. Data from the much larger but slower main memory is automatically staged into the cache by special hardware on a demand basis.

When a memory read operation is requested by the processor, the cache memory is checked to determine whether or not the data is present in the cache memory. If the cache contains the referenced data, the cache provides the data to the processor. Otherwise, the data is further accessed from the main memory. Therefore, the cache can store frequently accessed information and improve the processor performance by delivering the needed information faster than the main memory. In a typical design, a cache memory uses a data array to store data and a tag array to store the tag addresses corresponding to the data.

A main memory address may include a tag field and an index field. The index field is used to index a specific tag address stored in the cache tag array. When a cache memory access is performed, the tag address stored in the cache tag array is read and it is then compared to the tag field of the main memory address. If the two tag addresses match, a cache "hit" has occurred and the corresponding data is read out from the cache to the processor. If the two tag addresses do not match, a cache "miss" has occurred and the requested data is not in the cache, and must be retrieved from other components such as the main memory.

SUMMARY

One embodiment is a cache memory system that includes a cache controller and a cache tag array. The cache tag array includes one or more ways, one or more indices, and a cache tag entry for each way and index combination. Each cache tag entry includes an error correction portion and an address portion. In response to an address request for data that includes a first index and a first address, the cache controller compares the first address to the cache tag entries of the cache tag array that correspond to the first index. When the comparison results in a miss, the cache controller corrects cache tag entries with an error that correspond to the first index using the corresponding error correction portions, and stores at least one of the corrected cache tag entries in a storage that is external to the cache tag array. The cache controller, for each corrected cache tag entry, replays the comparison using the least one of the externally stored corrected cache tag entries.

DETAILED DESCRIPTION

One embodiment is a cache memory system that detects a tag entry error when there is no match in a tag array in response to a memory address request. The system corrects the error, and the corrected tag entries are stored external to the tag array. The memory address request is compared to each of the externally stored corrected tag entries. Therefore, the request can proceed correctly in the event of a "hard" error in the tag array that prevents tag entries in the tag array from being corrected.

Figure 1:
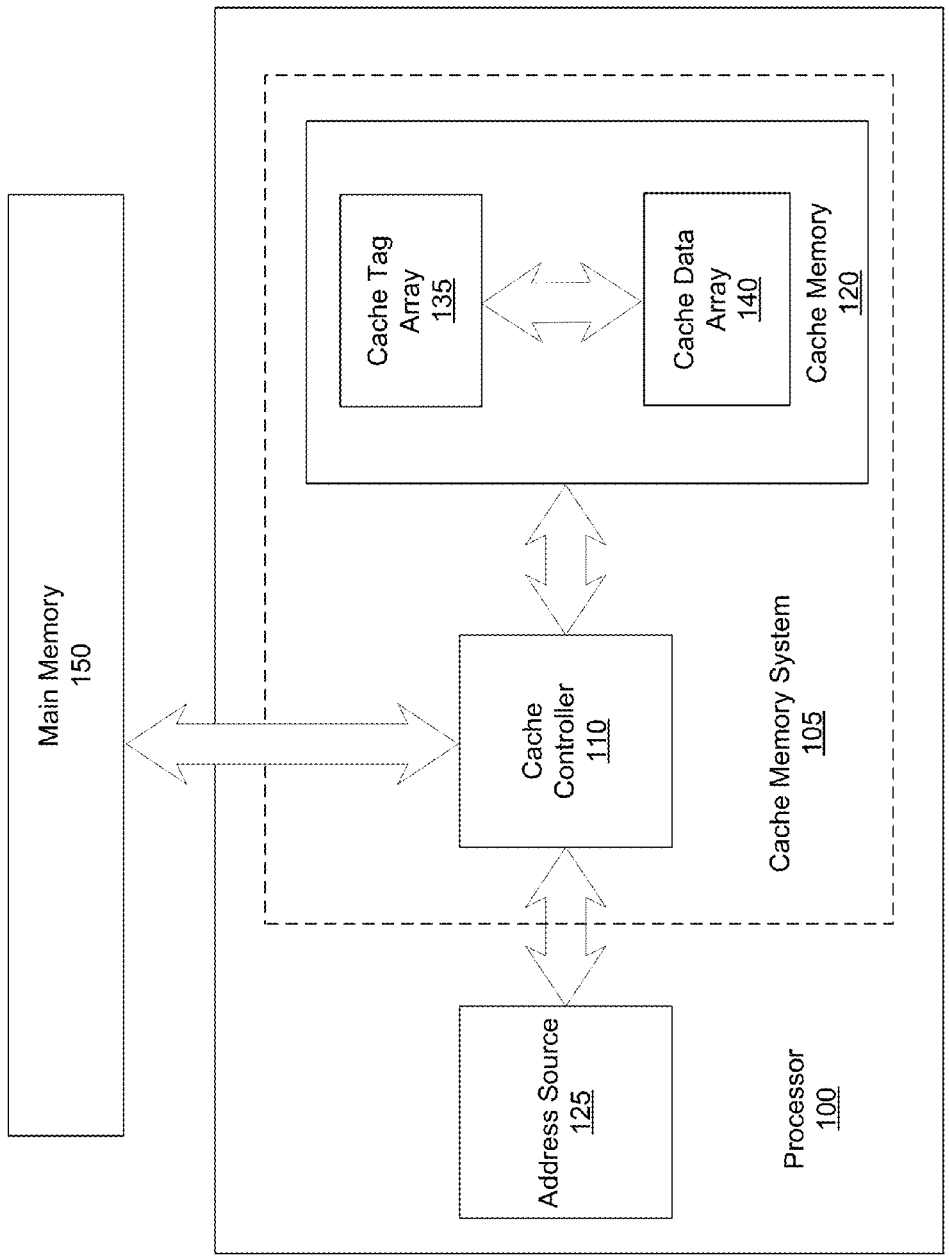
FIG. 1 is a block diagram of a processor with a cache memory system in accordance with one embodiment.

FIG. 1 is a block diagram of a processor 100 with a cache memory system 105 in accordance with one embodiment. Processor 100 includes an address source 125, and a cache controller 110 that is coupled to a cache memory 120. Cache memory 120 includes a cache tag array 135 and a cache data array 140. Processor 100 is coupled to main/system memory 150. Cache controller 110, in one embodiment, includes a computer readable medium that stores instructions that generate functionality disclosed in detail below for hard error proofing cache tag array 135. In other embodiments, the functionality is generated by hardware, or a combination of hardware and software.

In the embodiment of FIG. 1, processor 100 and cache memory system 105 are integrated within a common integrated circuit ("IC") chip. In one embodiment, cache memory 120 may be a level 2 ("L2") cache, although in other embodiments, cache memory 120 may be any level cache and may be implemented on a common or separate IC chip. Depending upon the implementation and whether the cache memory is an instruction cache or a data cache, address source 125 may be either a load/store unit or a fetch unit, respectively, of processor 100.

Each entry in cache tag array 135 has a corresponding entry in cache data array 140. A given entry in cache tag array 135 is defined to store a memory address for data stored in the corresponding entry in cache data array 140. Therefore, cache tag array 135 and cache data array 140 are equivalent in terms of the number and arrangement of entries.

Figure 2:
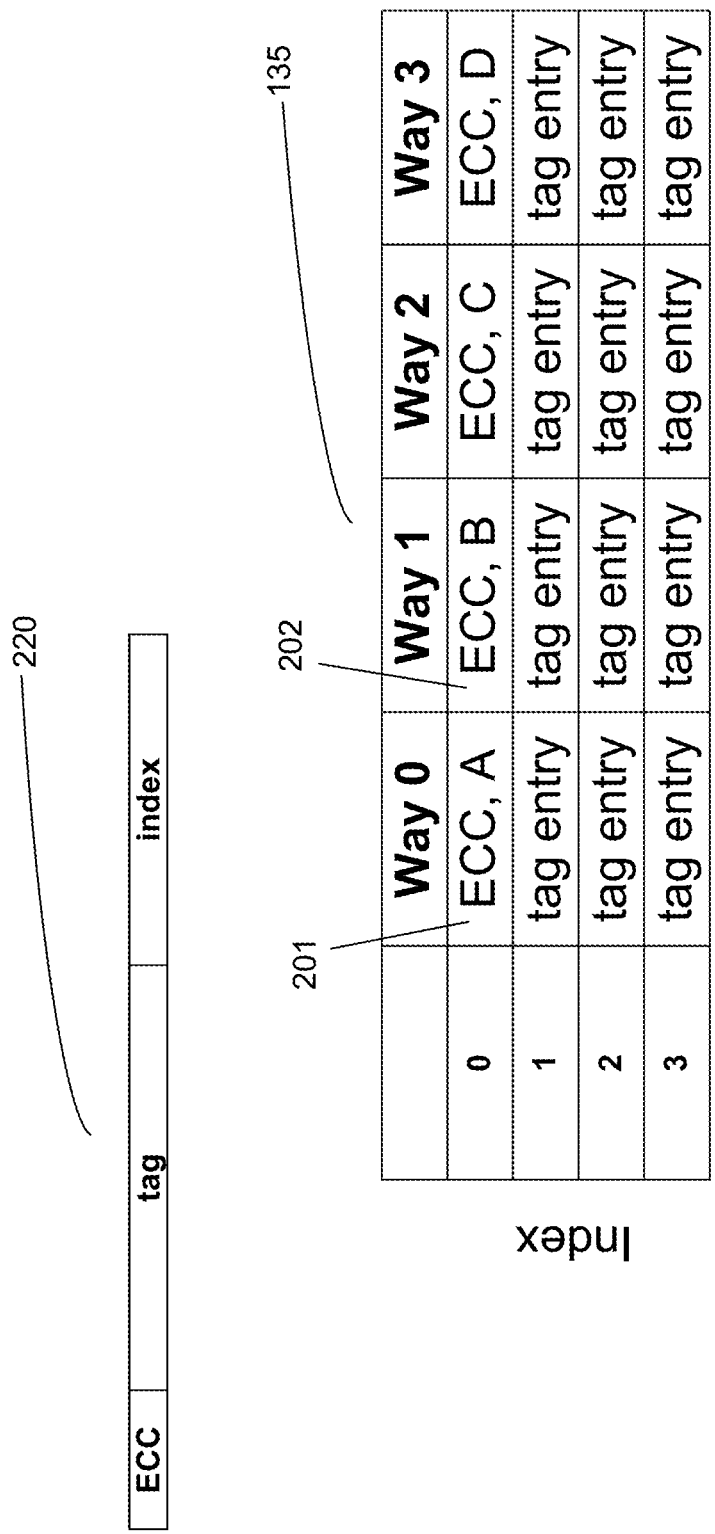
FIG. 2 is illustrates the structure of the cache tag array of FIG. 1 in accordance with one embodiment.

FIG. 2 is illustrates the structure of cache tag array 135 of FIG. 1 in accordance with one embodiment. Cache tag array 135 is a two-dimensional structure having a number of rows of indices ("Index"), and a number of columns of ways ("Way 0", "Way 1", etc.). In the example of FIG. 2, the tag structure includes four indices and four ways. However, in other embodiments, a different number of indices and a different number of ways can be used to define the tag structure.

Each entry in cache tag array 135 corresponds to a particular index (0-3) and a particular way (0-3). Each entry in cache tag array 135 specifies an address and an error-correcting code ("ECC") or parity bits. In the example of FIG. 2, entry 201 has an address "A" and a corresponding ECC, entry 202 has an address "B" and a corresponding ECC, etc. The ECC allows the corresponding address to be checked for validity and recreated in the event of an error in a known manner.

In one embodiment, an address received by cache controller 110 from address source 125 includes a tag, an index, and an ECC. An example address for address "A" is shown in FIG. 2 as address 220. The ECC and tag portion of address 220 corresponds to an entry in cache tag array 135, assuming data for that address is stored in cache data array 140. The index portion of address 220 corresponds to one of the indices of cache tag array 135.

In operation, a memory address, such as address 220, is received from address source 125 in response to a request/instruction from any type of device, such as processor 100 of FIG. 1. One example of a request is "load to address A". In this example, cache controller 110 would receive address A in the form of address 220 of FIG. 2. Address A would include an ECC, a tag "A", and an index (e.g., "0"). In response, cache controller 110 will compare/examine each way within cache tag array 135 at index "0" looking for tag "A".

In the example of FIG. 2, cache controller 110 should get a "hit" on entry 201 of cache tag array 135 because it stores an "A" at index "0". A hit indicates that the desired data is stored in cache data array 140, and cache controller 110 will then retrieve that data. However, in some situations, one or more entries in cache tag array 135 have errors that cause one or more bits of the entry to be wrong (i.e., "0" instead of a "1", or vice versa). If entry 201 has an error, cache controller 110 will get a "miss" instead of a "hit" for address A.

In some cache memory systems, when cache controller 110 receives a miss, the parity, using the ECC, is checked for all entries with the same index. If a parity error is detected, the ECC is used to determine the correct entry, and the correct entry is written back to the array. Therefore, in the above example with an entry error, when there is a miss for address A, entry 201 will be corrected, and the request will be replayed. Assuming entry 201 was corrected properly, cache controller 110 will then get a hit and the data will be retrieved.

However, in certain circumstances, the error in one of the entries of cache tag array 135 is the result of a "hard" error. A hard error is an error due to a physical defect or abnormality of the integrated circuit that forms cache tag array 135, and can result in a "stuck" bit that cannot be "flipped" or changed. Therefore, a bit that is stuck at "1" cannot be changed to "0", or vice versa, no matter how many times it is corrected and rewritten.

In the above example, in the case of a hard error, when entry 201 is corrected, it will continue to cause a miss when the address request comparison is repeated. In these systems, cache controller 110 may continuously and endlessly loop while trying to correct the hard error until the system generates some kind of interrupt or higher level error handling. This can cause unnecessarily processing steps and delays, and will likely never lead to the cache hit that would have resulted but for the hard error.

In order to avoid these problems, in one embodiment each corrected tag entry for a corresponding index of cache tag array 135 is stored external to cache tag array 135. In one embodiment, the external storage/memory may be internal to cache controller 110, but it can be any storage accessible to cache controller 110 in other embodiments, as long as it is not part of tag array 135. After each tag entry is corrected and stored externally, the request is replayed and the received address is compared to the externally stored corrected cache tag array entry. The result of that comparison is also stored externally, and then the next tag entry for the index is corrected, stored externally, and compared. During the comparison of the externally stored corrected cache tag array entries, if there is a hit the corresponding data is retrieved from cache data array 140, thus avoiding the potentially endless loop of other systems. When a hit is generated on the external entries, the result of the replayed request on cache tag array 135 will be ignored, since it will generate a miss due to the hard error. In the example of FIG. 2, the replayed request will result in a hit on the externally stored entry 201 of cache tag array 135.

In another embodiment, rather than storing and comparing one corrected cache tag array entry in a serial manner, all cache tag array entries for an index are corrected and stored externally. The replayed request can then perform a comparison of all of the externally stored corrected tag entries for the index at one time.

Figure 3:
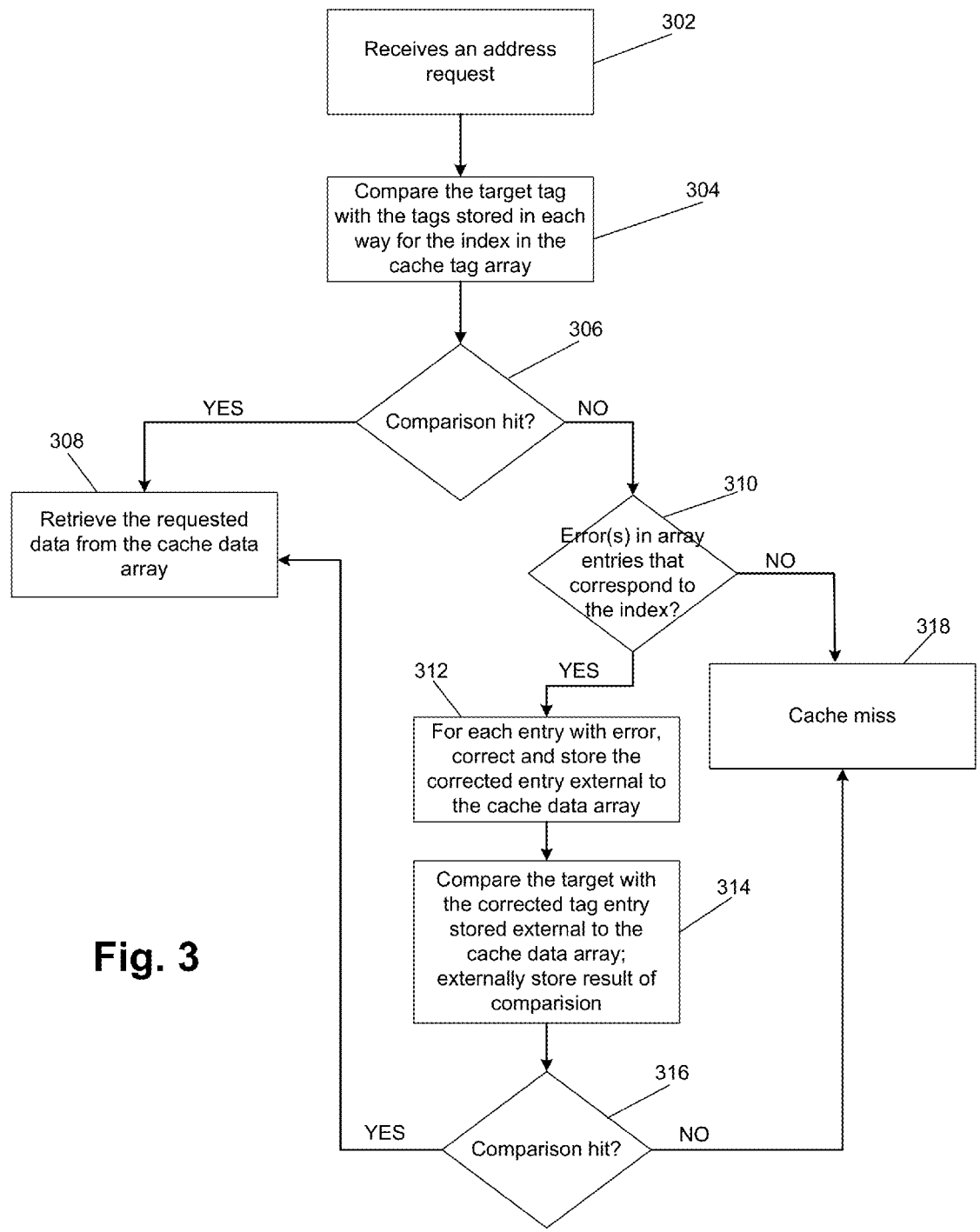
FIG. 3 is a flow diagram of the functionality of the cache controller of FIG. 1 when hard error proofing a cache tag array in accordance with one embodiment.

FIG. 3 is a flow diagram of the functionality of cache controller 110 of FIG. 1 when hard error proofing a cache tag array in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, cache controller 110 receives an address request for data or instructions stored at a memory address from address source 125. The address request could be generated by a processor or any other type of device. The address request or "target address" includes an index, a tag, and a parity/ECC bit(s) or any other type of error detection and correction bits.

At 304, in response to the target address, cache controller 102 compares the target tag with the tags stored in each way for the specified index in cache tag array 135.

At 306, based on the comparison, it is determined whether there was a hit. A hit occurs when the target tag matches one of the tags stored in array 135. If there is no hit, the comparison generates a miss.

If there is a hit at 306, that means that the corresponding data is stored in cache data array 140. If yes at 306, at 308, the data is retrieved from cache data array 140.

If no at 306 (i.e., a cache miss), at 310 each entry in array 135 for the index specified in the target address is checked for errors. The error check uses the ECC bit(s) or parity bit in a known manner to determine whether there is an error in the tag.

If there is not an error at 310, the cache miss is confirmed at 318 and cache controller 110 continues with additional functionality that is typically associated with a cache miss, such as checking if the data is stored in other levels of cache, or retrieving the data from main memory.

If there is one or more errors at 310, at 312 cache controller 110, for each entry with an error, corrects the entry using the ECC bits, and stores the corrected entry external to array 135. Cache controller 110 also corrects the error in array 135 by rewriting the corrected entries in array 135, but in the case of a hard error the entry in array 135 will continue to be in error because of one or more stuck bits. In another embodiment, all entries with errors can be corrected and stored externally at the same time rather than serially.

At 314, the comparison is replayed by comparing the targeted tag with the corrected tag entry stored external to array 135. The result of the comparison is also stored externally. The next corrected tag entry is then stored externally and compared with the targeted tag. In another embodiment, where all corrected entries are stored externally at once, the comparison is made with all corrected tag entries.

At 316, based on the comparison to the externally stored entries, and the externally stored comparison results, a determination is made of whether there is a hit. If yes at 316, the functionality continues at 308 where the data is retrieved from the data array. if no at 316, assuming all corrected entries have been compared, the functionality continues at 318 where a cache miss is confirmed.

As disclosed, embodiments hard error proof a cache tag array by externally storing corrected tag entries. A comparison is then made between the requested tag and at least one of the externally stored entries. If there is a hit, the data is retrieved from the cache. Therefore, in the event of a hard error which likely will never result in a hit of a tag entry in the cache tag array, embodiments allow the data to be retrieved from the cache and a potentially endless loop be avoided. The cause for the hard error can then be remedied at a later time.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A cache memory system comprising:
    a cache controller; and
    a cache tag array coupled to the cache controller;
    wherein the cache tag array comprises one or more ways, one or more indices, and a cache tag entry for each way and index combination, and wherein each cache tag entry comprises an error correction portion and an address portion;
    in response to an address request for data, the address request comprising a first index and a first address, the cache controller compares the first address to the cache tag entries of the cache tag array that correspond to the first index;
    when the comparison results in a miss, the cache controller corrects cache tag entries with an error that correspond to the first index using the corresponding error correction portions, and stores at least one corrected cache tag entry in a storage that is external to the cache tag array;
    wherein the cache controller replays the comparison using the at least one externally stored corrected cache tag entry.

2. The cache memory system of claim 1, wherein the comparison results in the miss in response to the first address not being found in one or more of the cache tag entries that correspond to the first index.

3. The cache memory system of claim 2, wherein the first address not being found in one or more of the cache tag entries that correspond to the first index is due to an error in one or more of the cache tag entries that correspond to the first index.

4. The cache memory system of claim 2, further comprising:
    a cache data array coupled to the cache tag array;
    wherein the first address not being found in one or more of the cache tag entries that correspond to the first index is due to the data not being stored in the cache data array.

5. The cache memory system of claim 3, wherein the error is a hard error.

6. The cache memory system of claim 1, further comprising:
    a cache data array coupled to the cache tag array;
    wherein when the replayed comparison using the externally stored corrected cache tag entries results in a hit, first data corresponding to the first address is retrieved from the cache data array and returned to a requester of the data.

7. The cache memory system of claim 1, wherein the address request is received from a processor.

8. The cache memory system of claim 1, wherein when the replayed comparison using the externally stored corrected cache tag entries results in a miss, a cache miss is returned to a requester of the data.

9. The cache memory system of claim 1, wherein a result of the replayed comparison using at least one externally stored corrected cache tag entry is stored in the storage that is external to the cache tag array.

10. A method of operating a cache memory system comprising:
    receiving at a cache controller an address request for data, the address request comprising a first index and a first address,
    comparing by the cache controller the first address to the cache tag entries of a cache tag array that correspond to the first index, wherein each cache tag entry comprises an error correction portion and an address portion;
    when the comparing results in a miss, correcting by the cache controller cache tag entries with an error that correspond to the first index using the corresponding error correction portions;
    storing at least one corrected cache tag entry in a storage that is external to the cache tag array; and
    replaying the comparing using the at least one externally stored corrected cache tag entry.

11. The method of claim 10, wherein the comparing results in the miss in response to the first address not being found in one or more of the cache tag entries that correspond to the first index.

12. The method of claim 11, wherein the first address not being found in one or more of the cache tag entries that correspond to the first index is due to an error in one or more of the cache tag entries that correspond to the first index.

13. The method of claim 12, wherein the error is a hard error.

14. The method of claim 10, wherein a result of the replaying the comparing using at least one externally stored corrected cache tag entry is stored in the storage that is external to the cache tag array.

15. A non-transitory computer readable medium having instructions stored thereon that, when executed by a cache controller, causes the controller to operate a cache memory system, the operating comprising:
    receiving an address request for data, the address request comprising a first index and a first address,
    comparing the first address to the cache tag entries of a cache tag array that correspond to the first index, wherein each cache tag entry comprises an error correction portion and an address portion;
    when the comparing results in a miss, correcting cache tag entries with an error that correspond to the first index using the corresponding error correction portions;
    storing at least one corrected cache tag entry in a storage that is external to the cache tag array; and
    replaying the comparing using the at least one externally stored corrected cache tag entry.

16. The computer readable medium of claim 15, wherein the comparing results in the miss in response to the first address not being found in one or more of the cache tag entries that correspond to the first index.

17. The computer readable medium of claim 16, wherein the first address not being found in one or more of the cache tag entries that correspond to the first index is due to an error in one or more of the cache tag entries that correspond to the first index.

18. The computer readable medium of claim 17, wherein the error is a hard error.

19. The computer readable medium of claim 15, wherein a result of replaying the comparing using at least one externally stored corrected cache tag entry is stored in the storage that is external to the cache tag array.

20. The computer readable medium of claim 15, wherein the address request is received from a processor.

* * * * *

UNITED STATES PATENT AND TRADEMARK OFFICE
CERTIFICATE OF CORRECTION

PATENT NO. : 8,549,383 B2  
APPLICATION NO. : 13/216829  
DATED : October 1, 2013  
INVENTOR(S) : Sivaramakrishnan et al.

Page 1 of 1

It is certified that error appears in the above-identified patent and that said Letters Patent is hereby corrected as shown below:

In the Drawings

On Sheet 3 of 3, in figure 3, under Reference Numeral No. 314, line 6, delete "comparision" and insert -- comparison --, therefor.

Signed and Sealed this  
Eighteenth Day of February, 2014

Michelle K. Lee  
*Deputy Director of the United States Patent and Trademark Office*